US011491356B2

(12) United States Patent
Kjellman

(10) Patent No.: US 11,491,356 B2
(45) Date of Patent: Nov. 8, 2022

(54) SYSTEM AND METHOD FOR DELIVERING FIRE SUPPRESSION AGENT TO AN OBSTRUCTED GAS APPLIANCE

(71) Applicant: Carrier Corporation, Jupiter, FL (US)

(72) Inventor: Thomas Kjellman, Uxbridge, MA (US)

(73) Assignee: Carrier Corporation, Palm Beach Gardens, FL (US)

(*) Notice: Subject to any disclaimer, the term of this patent is extended or adjusted under 35 U.S.C. 154(b) by 43 days.

(21) Appl. No.: 16/754,526

(22) PCT Filed: Oct. 11, 2018

(86) PCT No.: PCT/US2018/055411
§ 371 (c)(1),
(2) Date: Apr. 8, 2020

(87) PCT Pub. No.: WO2019/075199
PCT Pub. Date: Apr. 18, 2019

(65) Prior Publication Data

US 2020/0238112 A1 Jul. 30, 2020

Related U.S. Application Data

(60) Provisional application No. 62/572,164, filed on Oct. 13, 2017.

(51) Int. Cl.
*A62C 3/00* (2006.01)
*A62C 2/04* (2006.01)
(Continued)

(52) U.S. Cl.
CPC ................ *A62C 3/006* (2013.01); *A62C 2/04* (2013.01); *A62C 37/44* (2013.01); *F23D 14/72* (2013.01)

(58) Field of Classification Search
CPC ........... A62C 3/006; A62C 2/04; A62C 37/44; A62C 35/13; A47J 37/1266; F23D 14/72
See application file for complete search history.

(56) References Cited

U.S. PATENT DOCUMENTS 3,448,808 A * 6/1969 Olson .................... A62C 3/006 169/59
3,463,233 A * 8/1969 Haessler ............ F24C 15/2021 169/59
(Continued)

FOREIGN PATENT DOCUMENTS

CA 2109558 A1 5/1995
JP 2006-212205 A 8/2006

OTHER PUBLICATIONS

International Search Report issued in PCT/US2018/055411, dated Jan. 15, 2019.

*Primary Examiner* — Joseph A Greenlund
(74) *Attorney, Agent, or Firm* — Locke Lord LLP; Joshua L. Jones; Gabrielle L. Gelozin

(57) ABSTRACT

A system for delivering a fire suppression agent to an obstructed cooking appliance is disclosed, which includes a fuel delivery path extending from a source of cooking fuel to a burner of the cooking appliance, a source of fire suppression agent selectively in fluid communication with the fuel delivery path, and a valve assembly associated with the fuel delivery path and the source of fire suppression agent, wherein the valve assembly is configured to control the delivery of fire suppression agent to the burner of the cooking appliance and shut off the burner from the source of cooking fuel.

19 Claims, 4 Drawing Sheets

(51) Int. Cl.
*F23D 14/72* (2006.01)
*A62C 37/44* (2006.01)

(56) References Cited

U.S. PATENT DOCUMENTS

| | | | | |
|---|---|---|---|---|
| 3,584,688 A * | 6/1971 | Duncan | A62C 3/006 | 169/59 |
| 4,751,915 A * | 6/1988 | Price | A47J 37/1247 | 99/403 |
| 4,898,151 A * | 2/1990 | Luebke | A47J 37/1247 | 219/400 |
| 5,249,510 A * | 10/1993 | Rozak | A47J 37/1228 | 99/344 |
| 5,297,636 A * | 3/1994 | North | A62C 3/006 | 169/65 |
| 5,353,880 A * | 10/1994 | Green | A47J 37/0786 | 126/41 R |
| 6,186,241 B1 * | 2/2001 | Murr | A62C 3/006 | 169/65 |
| 2007/0240887 A1 * | 10/2007 | Howeth | A62C 3/006 | 239/548 |
| 2007/0246234 A1 * | 10/2007 | Vegso | A62C 37/12 | 169/59 |
| 2008/0149354 A1 * | 6/2008 | Biehl | A47J 27/0817 | 169/65 |
| 2008/0250939 A1 * | 10/2008 | See | A62C 3/006 | 99/403 |
| 2011/0147017 A1 * | 6/2011 | Saglam | A62C 3/07 | 169/65 |
| 2015/0136430 A1 * | 5/2015 | Livchak | A62C 3/006 | 169/61 |
| 2015/0231432 A1 * | 8/2015 | Zlatintsis | A62C 37/46 | 169/61 |
| 2016/0030782 A1 * | 2/2016 | Livchak | B01D 5/0027 | 169/46 |
| 2017/0014657 A1 * | 1/2017 | Rennie | A62C 3/08 | |
| 2017/0144002 A1 * | 5/2017 | Ben Neria | A62C 37/44 | |
| 2017/0232284 A1 * | 8/2017 | Farley | A62C 37/40 | 169/46 |
| 2019/0192892 A1 * | 6/2019 | Johnson | A62C 35/023 | |
| 2019/0390859 A1 * | 12/2019 | Lambertson | F24C 15/20 | |
| 2020/0054905 A1 * | 2/2020 | Livchak | G08B 5/36 | |
| 2020/0238112 A1 * | 7/2020 | Kjellman | A62C 37/44 | |
| 2020/0306570 A1 * | 10/2020 | Kjellman | A62C 37/40 | |
| 2021/0138286 A1 * | 5/2021 | Bouchard | A62C 37/50 | |

* cited by examiner

SYSTEM AND METHOD FOR DELIVERING FIRE SUPPRESSION AGENT TO AN OBSTRUCTED GAS APPLIANCE

CROSS-REFERENCE TO RELATED APPLICATIONS

This application is a U.S. National Phase Application filed under 35 U.S.C. § 371, based on International PCT Patent Application No. PCT/US2018/055411, filed Oct. 11, 2018, which application claims priority to U.S. Provisional Patent Application No. 62/572,164 filed on Oct. 13, 2017. The entire contents of these applications is incorporated herein by reference.

BACKGROUND OF THE INVENTION

1. Field of the Invention

The subject disclosure relates to a system and method for delivering a fire suppression agent to a cooking appliance in the event of a fire, and more particularly, to a system and method for delivering a fire suppression agent to an obstructed gas-fueled cooking appliance through a dedicated fuel delivery path.

2. Description of Related Art

The use of automatically activated fire extinguishing devices for unobstructed cooking appliances such as stoves, grills and the like is well known. Such devices provide a source of fire extinguishing compound or a fire suppression agent for release onto an unobstructed cooking surface in the event of a fire. The fire extinguishing compound is generally stored in a container located remote from the cooking appliance, and a dedicated piping arrangement typically connects the container to a spraying device located above the cooking surface that dispenses the compound to put out the fire.

These prior art fire extinguishing devices have the disadvantage of requiring on-site installation involving time and expense over and above that required for installation of the cooking appliance itself. Moreover, as the distance between the container and the spraying device is increased, more propellant is required to transport the fire extinguishing compound from the container, which in turn requires a larger container for storage of the propellant along with the fire extinguishing compound. In addition, the fire extinguisher container and the piping from the container to the appliance are unsightly, and the spraying nozzles that typically protrude down from above the stove surface can interfere with normal cooking activities.

In some commercial kitchens, certain cooking appliances have a fire hazard volume that is relatively difficult to reach with a typical overhead vertical spraying device, such as, for example, an enclosed culinary grill. To protect this type of hazard, a dedicated nozzle must be piped around any obstructing geometry or structures so that fire suppressant can be sprayed directly into the hazard volume in the event of a fire.

It would be beneficial to provide a system for delivering a fire suppression agent into the cooking volume of an obstructed cooking appliance, without having to provide dedicated piping to deliver the fire suppression agent. The subject invention provides such a system, in that it advantageously utilizes the existing fuel delivery path to deliver fire suppression agent into the obstructed cooking volume.

SUMMARY OF THE DISCLOSURE

The subject invention is directed to a new and useful system for delivering a fire suppression agent to a cooking appliance. The system includes a fuel delivery path extending from a source of cooking fuel to a burner of the cooking appliance, a source of fire suppression agent selectively in fluid communication with the fuel delivery path, and a valve assembly operatively associated with the fuel delivery path and the source of fire suppression agent. The valve assembly is configured to control the delivery of fire suppression agent to the burner of the cooking appliance and shut off the burner from the source of cooking fuel.

The valve assembly has a first position permitting fluid communication between the source of cooking fuel and the burner through the fuel delivery path, while preventing fluid communication between the source of fire suppression agent and the burner through the fuel delivery path. The valve assembly has a second position preventing fluid communication between the source of cooking fuel and the burner through the fuel delivery path, while permitting fluid communication between the source of fire suppression agent and the burner through the fuel delivery path.

The system further includes an actuation mechanism connected to the valve assembly for facilitating the movement of the valve assembly from the first position to the second position. In one embodiment of the invention, the actuation mechanism is mechanically actuated by a fusible link or the like. In another embodiment of the invention, the actuation mechanism is electrically actuated by a solenoid switch or the like. Preferably, the actuation mechanism is operatively associated with a condition sensing device, such as, for example, a smoke detector or a heat sensor. The condition sensor will activate or otherwise trigger the actuation mechanism upon detecting excess heat, smoke or another sensed condition beyond a certain allowable level or limit. In the alternative, an override switch or pull station could be operatively associated with the actuation mechanism, in addition to or instead of the condition sensor, to manually activate the fire suppression system.

It is envisioned that the system disclosed herein could be configured to provide fire suppression service to plural cooking appliances located within a kitchen that are all operatively associated with a valve assembly connected to the fuel delivery path of each appliance and a source of fire suppression agent. It is also envisioned that plural sources of fire suppression agent could be arranged in a bank that is in fluid communication with the valve assembly through a manifold.

The subject invention is also directed to a system for delivering fire suppression agent to a cooking appliance, which includes a fuel delivery path extending from a source of cooking fuel to a burner of the cooking appliance, a source of fire suppression agent selectively in fluid communication with the fuel delivery path, and a valve assembly operatively associated with the fuel delivery path and the source of fire suppression agent, wherein the valve assembly has: a first position permitting fluid communication between the source of cooking fuel and the burner through the fuel delivery path, while preventing fluid communication between the source of fire suppression agent and the burner through the fuel delivery path; and a second position preventing fluid communication between the source of cooking fuel and the burner through the fuel delivery path, while permitting fluid communication between the source of fire suppression agent and the burner through the fuel delivery path in the event of a fire.

The subject invention is also directed to a method of delivering fire suppression agent to an obstructed cooking appliance, which includes the steps of connecting a source of fire suppression agent to a fuel delivery path extending from a source of cooking fuel to a burner of the cooking appliance, and facilitating the delivery of fire suppression agent to the burner of the cooking appliance as cooking fuel to the burner is shut off from a source of cooking fuel in the event of a fire.

Preferably, the step of facilitating the delivery of fire suppression agent involves facilitating the actuation of a valve assembly operatively associated with the fuel delivery path and the source of fire suppression agent. In one embodiment of the invention, the step of facilitating the actuation of a valve assembly involves facilitating the mechanical actuation of the valve assembly. In another embodiment of the invention, the valve assembly involves facilitating the electrical actuation of the valve assembly. Alternatively, in the event of a fire, the valve assembly could be manually activated from a pull station or the like.

These and other features of the subject invention and the manner in which it is manufactured, assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art will readily understand how to make and use the fire suppression system of the subject invention without undue experimentation, preferred embodiments thereof will be described in detail herein below with reference to the figures wherein.

DETAILED DESCRIPTION OF THE PREFERRED EMBODIMENTS

Figure 1:
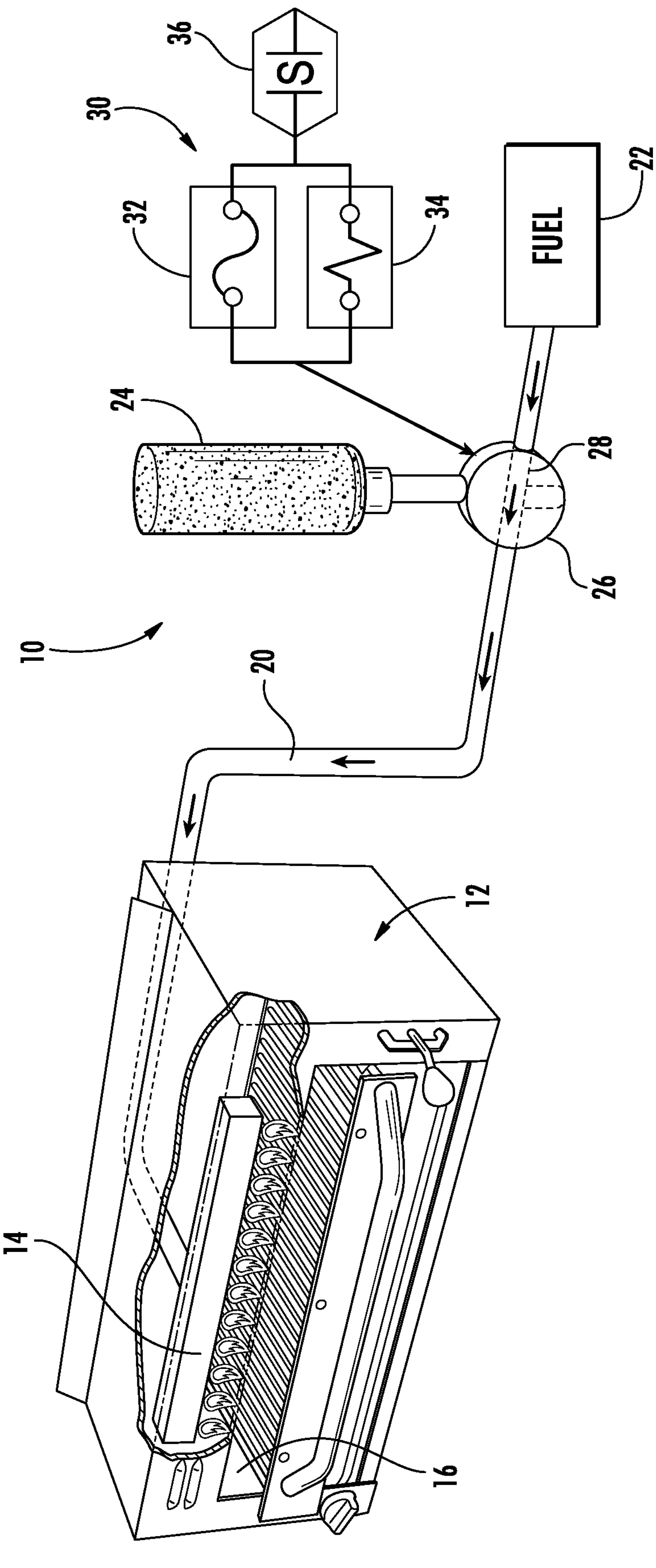
FIG. 1 is an illustration of a system for delivering fire suppression agent to an obstructed gas-fueled cooking appliance in the event of a fire, which includes a valve assembly operatively associated with the fuel delivery path of the appliance and a source of fire suppression agent, wherein the valve assembly is shown in a position that permits fluid communication between a source of cooking fuel and the appliance through the fuel delivery path, while preventing fluid communication between the source of fire suppression agent and the appliance.

Referring now to the drawings wherein like reference numerals identify similar structural elements or features of the subject invention, there is illustrated in FIG. 1 a system 10 for delivering a fire suppression agent to a cooking appliance, and more particularly, to an obstructed cooking appliance designated generally by reference numeral 12. It is envisioned that the delivery system 10 of the subject invention would be integrated with or otherwise housed within the cooking appliance 12 itself, rather than being located separate or otherwise remote from the cooking appliance 12. The location of the delivery system 10, either within or attached to the housing of the cooking appliance 12, would vary depending upon the overall structural design of the appliance.

As used herein, the term obstructed cooking appliance refers to a cooking appliance with a self-contained or otherwise enclosed cooking volume, such as, for example, a culinary grill characterized by very high temperature overhead gas heating elements. These cooking appliances are generally found in professional or commercial kitchens and are typically used for overhead grilling, and some types are commonly referred to as salamander grills.

As discussed in more detail below, the delivery system 10 of the subject invention uses the burners 14 that are located within the enclosed cooking appliance 12 as spray nozzles for delivering a fire suppression agent into the obstructed cooking volume 16. In the event of a fire, as fuel to the burner 14 is shut off from the supply of fuel 22, the suppression agent is allowed to flow into the dedicated fuel delivery piping, which carries the agent directly into the cooking volume 16 of the appliance 12 without requiring any additional piping to be installed.

Those skilled in the art will readily appreciate that this design simplifies the installation of the fire suppression system by eliminating the need for dedicated suppressant piping in and around any obstructions that may be associated with the cooking appliance, as is typical in prior art fire suppression systems found in most commercial kitchens. Therefore, system installation costs are reduced, kitchen staff has less piping in their workspace, and dedicated piping need not be rearranged if or when the cooking appliance is moved. Additionally, because the system is integrated within and can otherwise move with the cooking appliance itself, it would not be possible to leave the appliance unprotected if it is moved away from any suppression agent delivery piping and spray nozzles.

With continuing reference to FIG. 1, the fire suppression system 10 includes a dedicated fuel delivery path 20 that extends from a source of cooking fuel 22 to the burner(s) 14 of the cooking appliance 12, which has an obstructed cooking volume 16. The source of cooking fuel can be a self-contained storage vessel (as depicted) or cooking fuel could be supplied from a remote source by a main distribution line leading into the kitchen. The cooking fuel could be propane, natural gas, or other suitable gas or liquid fuel, which may vary depending upon availability and/or cost.

A source of fire suppression agent in the form of a self-contained pressure vessel 24 is in fluid communication with the dedicated fuel delivery path 20 of the appliance 12. Those skilled in the art will readily appreciate that the fire suppression agent can be selected from materials such as nitrogen or a similar fire suppressing gas, water or a wet chemical agent, or the like. It is envisioned that the amount of fire suppression agent contained within the source 24 will be proportional to the size of the cooking volume 16 of the gas-fired cooking appliance 12. The pressure vessel 24 would also include a propellant for facilitating the transport of the fire suppression agent through the duel delivery path 20 in the event of a fire. Those skilled in the art will readily appreciate that a relatively small amount of propellant would be required in this system, due to the proximity of the fire suppressant source 24 to the obstructed cooking volume 16 being protected.

In accordance with a preferred embodiment of the subject invention, a valve assembly 26 is operatively associated with the dedicated fuel delivery path 20 and the source of fire suppression agent 24. The valve assembly 26 includes a two-way rotatable valve element 28 that is adapted and configured to control the delivery of fire suppression agent to the burner 14 of the cooking appliance 12, as cooking fuel to the burner 14 is shut off from the source of cooking fuel 22 in the event of a fire. Those skilled in the art will readily appreciate that valve assembly 26 will have appropriate internal sealing features associated with the rotating valve element 28 to prevent cross-talk between the internal flow paths and otherwise maintain the fluid integrity of the valve assembly 26.

Figure 2:
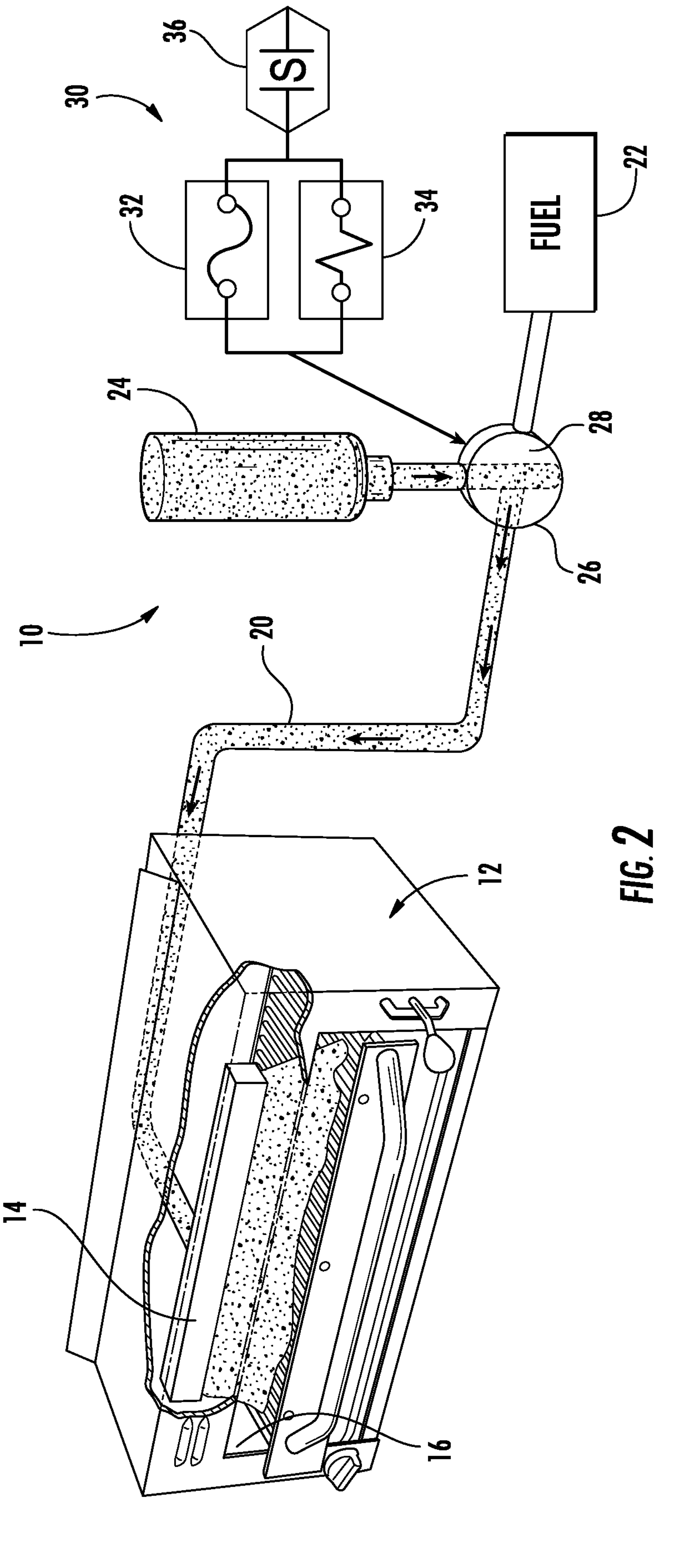
FIG. 2 is an illustration of the system shown in FIG. 1, wherein the valve assembly is in a position to prevent fluid communication between the source of cooking fuel and the cooking appliance, while permitting fluid communication between the source of fire suppression agent and the cooking appliance through the fuel delivery path of the appliance.

The rotatable valve element 28 of valve assembly 26 has a first operating position that permits fluid communication between the source of cooking fuel 22 and the burner 14 of the cooking appliance 12 through the fuel delivery path 20, while preventing fluid communication between the source of fire suppression agent 24 and the burner 14 through the fuel delivery path 20, which is depicted in FIG. 1. The rotatable valve element 28 of valve assembly 26 has a second operating position (rotated in a clockwise direction from the first position as shown in the depicted exemplary embodiment) that prevents fluid communication between the source of cooking fuel 22 and the burner 14 through the fuel delivery path 20, while permitting fluid communication between the source of fire suppression agent and the burner 14 through the fuel delivery path 20, which is depicted in FIG. 2. When valve element 28 is in the second position, the burner 14 of cooking appliance 12 functions as a spray nozzle to deliver fire suppression agent directly into the obstructed cooking volume 16 of appliance 12, without requiring installation of any additional piping for fire suppression.

The fire suppression system 10 further includes an actuation mechanism 30 operatively connected to valve assembly 26 to facilitate the movement of valve element 28 from the first position of FIG. 1 to the second position of FIG. 2 in the event of a fire within the obstructed cooking value 16 of appliance 12. In one embodiment of the invention, the actuation mechanism 30 is mechanically actuated by way of a fusible link 32 or the like. In another embodiment of the invention, the actuation mechanism 30 is electrically actuated by way of a solenoid switching mechanism 34 or the like. In an embodiment of the subject invention, the actuation mechanism 30 is also operatively associated with a cooking volume condition sensor 36, such as, for example, a heat sensor, a smoke detector or a similar condition sensing device cable of monitoring the operating environment of the cooking appliance 12.

The condition sensor 36 will activate or otherwise trigger the actuation mechanism 30 upon detecting excess heat, smoke or another sensed condition beyond a certain allowable level or limit. In the alternative, a manual override switch will be operatively associated with the actuation mechanism 30, in addition to or instead of the condition sensor 36. The manual override feature would be in the form of a pull station or the like, where the cook or kitchen staff could pull a pin or press a button in the event of a fire to activate the fire suppression system 10 as the kitchen is evacuated.

Figure 3:
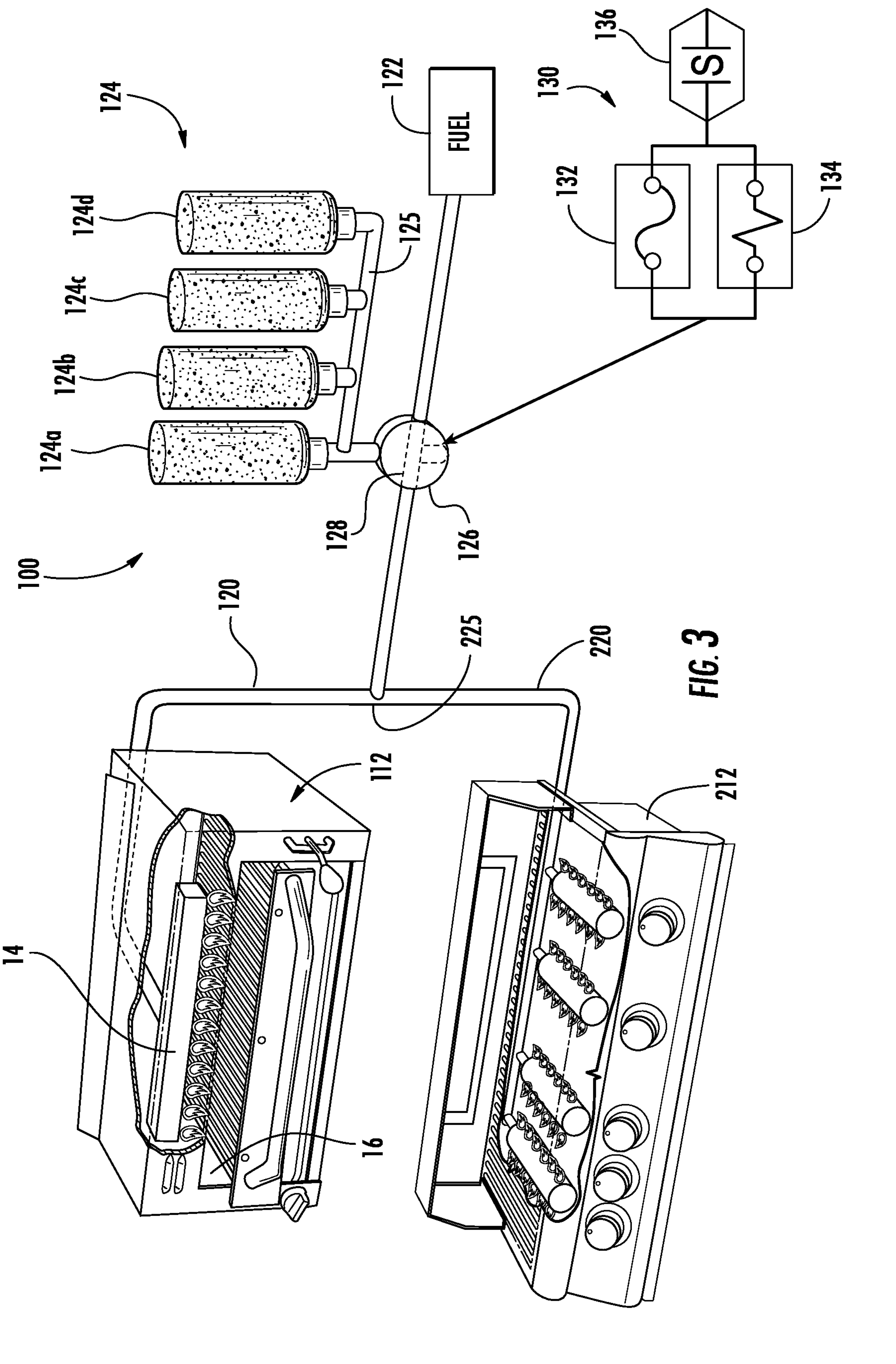
FIG. 3 is an illustration of a system for delivering fire suppression agent to a plurality of gas-fueled cooking appliances, which includes plural sources of fire suppression agent operatively associated with a valve assembly, wherein the valve assembly is in a position that permits fluid communication between a source of cooking fuel and the fuel delivery path of each cooking appliance.
Figure 4:
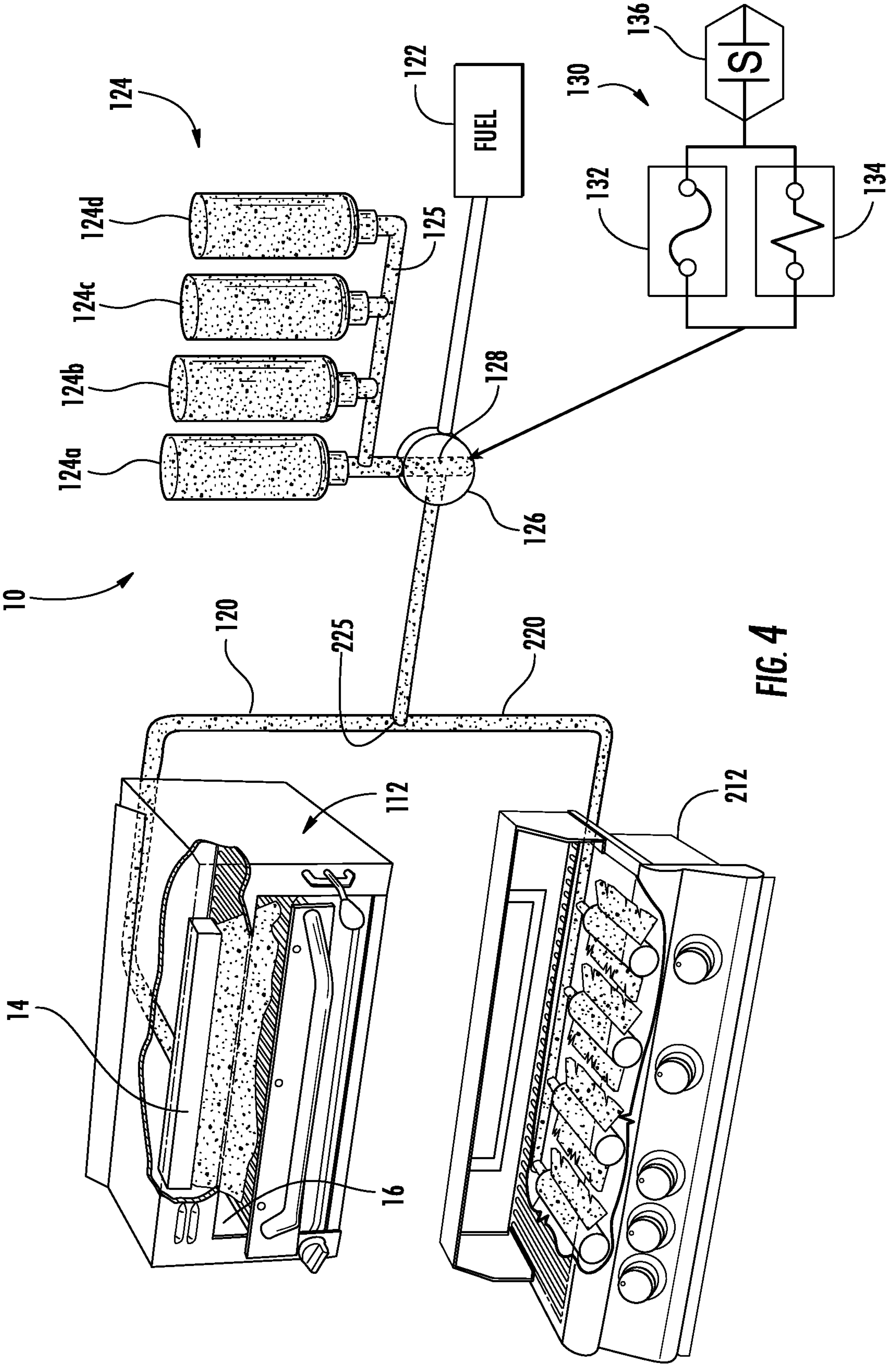
FIG. 4 is an illustration of the system shown in FIG. 3, wherein the valve assembly is in a position to permit fluid communication between the plural sources of fire suppression agent and the fuel delivery path of each cooking appliance.

Referring now to FIGS. 3 and 4, in another embodiment of the subject invention, a fire suppression system 100 would include two or more cooking appliances 112, 212 that are each in fluid communication with a valve assembly 126 through respective dedicated fuel delivery paths 120, 220 connected to a single source of cooking fuel 122. More particularly, system 100 could be operatively associated with an obstructed gas-fueled cooking appliance 112 in the form of an overhead broiler or the like, and free-standing cooking appliance such as a gas-fired grill 212, which may be located directly below the overhead grilling appliance 112 as depicted, and may be located elsewhere nearby the overhead grilling appliance 112.

It is envisioned that system 100 could also include plural sources of fire suppression agent that are all in fluid communication with the valve assembly 126, such as a bank 124 of storage vessels (124*a*-124*d*) that are connected to a manifold 125, which communicates with the valve assembly 126. In the event of a fire in one or both of the cooking appliances, the valve element 128 of valve assembly 126 would move from the first position of FIG. 3 to the second position of FIG. 4, so that as the fuel supply 122 is shut off, fire suppression agent is allowed to flow from the bank 124 into the obstructed cooking volume of one or more of the appliances 112, 212, without requiring any additional piping. In this regard, it is envisioned that a deflector switch could be located at the junction 225 between the fuel delivery paths 120, 220 to control the flow of fire suppression agent to either of the two appliances 112, 212. It is also envisioned that the manifold 125 could be configured to deliver the fire suppressant from each of the supply vessels 124*a*-124*d* of bank 124 in concert or in series. As in the previously described embodiment, an actuation assembly 130 in the form of a fusible ink 132 or solenoid switch 134 connected to a condition sensor 136 and/or a manual pull station facilitates the movement of valve member 128.

Referring once again to FIGS. 1 and 2, the subject invention is also directed to a method of delivering fire suppression agent to an obstructed gas-fueled cooking appliance 12, which includes the steps of connecting a source of fire suppression agent 24 to a dedicated fuel delivery path 20 extending from a source of cooking fuel 22 to a burner 14 of the cooking appliance 12, and facilitating the delivery of the fire suppression agent to the burner 14 of the cooking appliance 12 as cooking fuel to the burner 14 is shut off from a source of cooking fuel in the event of a fire, so that the burner 14 functions as a direct spray nozzle into the obstructed cooking volume 16.

The step of facilitating the delivery of fire suppression agent involves facilitating the actuation of a valve assembly 26 operatively associated with the fuel delivery path 20 and the source of fire suppression agent 24. In one embodiment of the invention, the step of facilitating the actuation of the valve assembly 26 involves facilitating the mechanical actuation of the valve assembly 26. In another embodiment of the invention, the step of facilitating the actuation of the valve assembly 26 involves facilitating the electrical actuation of the valve assembly 26. Alternatively, the valve assembly 26 could be manually activated from a pull station or the like.

While the subject disclosure has been shown and described with reference to preferred embodiments, those skilled in the art will readily appreciate that changes and/or modifications may be made thereto without departing from the scope of the subject disclosure.

What is claimed is:

1. A system for delivering fire suppression agent to a cooking appliance, comprising:

a fuel delivery path extending from a source of cooking fuel to a burner of the cooking appliance;

a source of fire suppression agent selectively in fluid communication with the fuel delivery path;

a valve assembly operatively associated with the fuel delivery path and the source of fire suppression agent, wherein the valve assembly is configured to control the delivery of fire suppression agent to the burner of the cooking appliance and shut off the burner from the source of cooking fuel without having to provide dedicated piping to deliver the fire suppression agent, wherein plural cooking appliances are in fluid communication with the valve assembly via separate fuel delivery paths, wherein the plural cooking appliances include different types of cooking appliances; and a deflector switch disposed at a junction between the plural cooking appliances configured to control the flow of fire suppressing agent to one or more of the plural cooking appliances.

2. The system of claim 1, wherein the valve assembly has a position permitting fluid communication between the source of cooking fuel and the burner through the fuel delivery path, while preventing fluid communication between the source of fire suppression agent and the burner through the fuel delivery path.

3. The system of claim 1, wherein the valve assembly has a position preventing fluid communication between the source of cooking fuel and the burner through the fuel delivery path, while permitting fluid communication between the source of fire suppression agent and the burner through the fuel delivery path.

4. The system of claim 3, further comprising an actuation mechanism operatively associated with the valve assembly for moving the valve assembly from the first positon to the second position.

5. The system of claim 4, wherein the actuation mechanism is mechanically actuated.

6. The system of claim 4, wherein the actuation mechanism is electrically actuated.

7. The system of claim 4, wherein the actuation mechanism is operatively associated with a condition sensor.

8. The system of claim 1, wherein the cooking appliance has an obstructed cooking volume and the burner is located within said cooking volume.

9. The system of claim 1, wherein plural sources of fire suppression agent are in fluid communication with the valve assembly.

10. A system for delivering fire suppression agent to a cooking appliance, comprising:

a fuel delivery path extending from a source of cooking fuel to a burner of the cooking appliance;

a source of fire suppression agent selectively in fluid communication with the fuel delivery path; and a valve assembly operatively associated with the fuel delivery path and the source of delivering fire suppression agent, the valve assembly having:

a first position permitting fluid communication between the source of cooking fuel and the burner through the fuel delivery path, while preventing fluid communication between the source of fire suppression agent and the burner through the fuel delivery path; and a second position preventing fluid communication between the source of cooking fuel and the burner through the fuel delivery path, while permitting fluid communication between the source of fire suppression agent and the burner through the fuel delivery path in the event of a fire, without having to provide dedicated piping to deliver the fire suppression agent, wherein plural cooking appliances are in fluid communication with the valve assembly via separate fuel delivery paths, wherein the plural cooking appliances include different types of cooking appliances; and a deflector switch disposed at a junction between plural cooking appliances configured to control the flow of fire suppressing agent to one or more of the plural cooking appliances.

11. The system of claim 10, wherein the cooking appliance has an obstructed cooking volume and the burner occupies said cooking volume.

12. The system of claim 10, further comprising an actuation mechanism connected to the valve assembly to facilitate movement of the valve assembly from the first position to the second position.

13. The system of claim 12, wherein the actuation mechanism is mechanically actuated.

14. The system of claim 12, wherein the actuation mechanism is electrically actuated.

15. The system of claim 12, wherein the actuation mechanism is operatively associated with a condition sensor.

16. A method of delivering fire suppression agent to a cooking appliance, comprising:

connecting a source of fire suppression agent to a fuel delivery path extending from a source of cooking fuel to a burner of the cooking appliance; and facilitating the delivery of fire suppression agent to the burner of the cooking appliance as cooking fuel to the burner is shut off from a source of cooking fuel, without having to provide dedicated piping to deliver the fire suppression agent, in the event of a fire, wherein plural cooking appliances are in fluid communication with the valve assembly via separate fuel delivery paths, wherein the plural cooking appliances include different types of cooking appliances, wherein facilitating includes, controlling a deflector switch disposed at a junction between the plural cooking appliances to facilitate the delivery of fire suppressing agent to one or more of the plural cooking appliances.

17. The method of claim 16, wherein the step of facilitating the delivery of fire suppression agent involves facilitating the actuation of a valve assembly operatively associated with the fuel delivery path and the source of fire suppression agent.

18. The method of claim 17, wherein the step of facilitating the actuation of a valve assembly involves facilitating the mechanical actuation of the valve assembly.

19. The method of claim 17, wherein the step of facilitating the actuation of a valve assembly involves facilitating the electrical actuation of the valve assembly.

* * * * *